(12) United States Patent
Goldman et al.

(10) Patent No.: US 12,054,642 B2
(45) Date of Patent: Aug. 6, 2024

(54) FAST DRYING, HIGH BUILD, SAG-RESISTANT COMPOSITIONS, COATINGS, TWO-COMPONENT PACK AND COATING PROCESS

(71) Applicants: BASF SE, Ludwigshafen (DE); Vincent J. Goldman, Waterford, MI (US)

(72) Inventors: Vincent J. Goldman, Waterford, MI (US); Andrew Recker, Canton, MI (US); Pallavi Bapat, Farmington Hills, MI (US); Kyle Kampf, Royal Oak, MI (US)

(73) Assignee: BASF SE (DE)

( * ) Notice: Subject to any disclaimer, the term of this patent is extended or adjusted under 35 U.S.C. 154(b) by 794 days.

(21) Appl. No.: 16/763,721

(22) PCT Filed: Nov. 13, 2018

(86) PCT No.: PCT/US2018/060725
§ 371 (c)(1),
(2) Date: May 13, 2020

(87) PCT Pub. No.: WO2019/099372
PCT Pub. Date: May 23, 2019

(65) Prior Publication Data
US 2020/0347242 A1    Nov. 5, 2020

Related U.S. Application Data

(60) Provisional application No. 62/680,321, filed on Jun. 4, 2018, provisional application No. 62/585,804, filed on Nov. 14, 2017.

(51) Int. Cl.
| | |
|---|---|
| C09D 7/61 | (2018.01) |
| C09D 5/18 | (2006.01) |
| C09D 7/63 | (2018.01) |
| C09D 133/08 | (2006.01) |
| C09D 133/12 | (2006.01) |
| C08K 3/30 | (2006.01) |

(52) U.S. Cl.
CPC ............... C09D 5/185 (2013.01); C09D 7/61 (2018.01); C09D 7/63 (2018.01); C09D 133/08 (2013.01); C09D 133/12 (2013.01); C08K 2003/3081 (2013.01)

(58) Field of Classification Search
CPC . C09D 5/185; C09D 7/61; C09D 7/63; C09D 133/08; C09D 133/12; C08K 2003/3081
USPC ......................................................... 524/423
See application file for complete search history.

(56) References Cited

U.S. PATENT DOCUMENTS

| | | | |
|---|---|---|---|
| 3,654,190 A | 4/1972 | Levine et al. | |
| 4,414,370 A | 11/1983 | Hamielec et al. | |
| 4,529,787 A | 7/1985 | Schmidt et al. | |
| 4,546,160 A | 10/1985 | Brand et al. | |
| 4,872,910 A * | 10/1989 | Eshleman | C09G 1/16 106/3 |
| 5,476,891 A | 12/1995 | Welna | |
| 7,045,079 B2 | 5/2006 | Erismann et al. | |
| 7,087,670 B2 | 8/2006 | Hoch et al. | |
| 7,217,753 B2 | 5/2007 | Sinclair et al. | |
| 7,820,736 B2 | 10/2010 | Reinheimer | |
| 8,729,155 B2 | 5/2014 | Wierzbicki et al. | |
| 8,932,497 B2 | 1/2015 | Gupta et al. | |
| 2007/0282046 A1 | 12/2007 | Killilea et al. | |
| 2008/0121851 A1 | 5/2008 | Reinheimer | |
| 2010/0209645 A1 | 8/2010 | Breen et al. | |
| 2011/0311830 A1 | 12/2011 | Wade | |
| 2012/0164462 A1 | 6/2012 | Schmitt et al. | |
| 2014/0005298 A1 | 1/2014 | Thewes | |
| 2014/0243446 A1 | 8/2014 | Turk et al. | |

(Continued)

FOREIGN PATENT DOCUMENTS

| | | |
|---|---|---|
| CN | 101191033 A | 6/2008 |
| CN | 102211430 A | 10/2011 |

(Continued)

OTHER PUBLICATIONS

International Preliminary Report on Patentability received for PCT Patent Application No. PCT/US2018/060725, mailed on May 28, 2020, 10 pages.
International Search Report and Written Opinion in International Application No. PCT/US2018/060725, mailed on Feb. 28, 2019.
Perstorp AB, "Charmor PM40 and PM15 for intumescent paints, Technical information Leaflet TI 0158," Dec. 2007.
Lin et al., "Effect of metal ion crosslinking agent on the performance of polyacrylate coatings", Journal of Suihua University, vol. 5, No. 01, 2009, pp. 186-187.

*Primary Examiner* — Kelechi C Egwim
(74) *Attorney, Agent, or Firm* — Faegre Drinker Biddle & Reath LLP

(57) ABSTRACT

A coating composition includes a first composition comprising a polymeric binder comprising a hyperbranched polymer or a polymer comprising a covalently bonded surfactant; a second composition comprising a coagulating agent; and an additive comprising an intumescent agent, a vibration damping agent, an insulation agent, or a combination of two or more thereof; wherein: the additive is present in the first composition, the second composition, or both the first and second compositions; the intumescent agent comprises an acid source, a carbon source, and a gas forming agent; the vibration damping agent comprises a first filler; the insulation agent comprises a second filler; and the first composition and the second composition are configured to form a coating within 30 seconds of application to a substrate, and the coating is non-sagging, water-resistant, and dry-to-the touch.

18 Claims, No Drawings

(56) References Cited

U.S. PATENT DOCUMENTS

2015/0218404 A1 8/2015 Bowles et al.
2016/0311381 A1 10/2016 Dimmer et al.
2018/0066146 A1 3/2018 Prevost et al.

FOREIGN PATENT DOCUMENTS

| CN | 103703068 A | 4/2014 | |
|---|---|---|---|
| CN | 105793302 A | 7/2016 | |
| CN | 106103604 A | 11/2016 | |
| EP | 2 058 364 A2 | 5/2009 | |
| EP | 2058364 A2 * | 5/2009 | ............ C08F 230/02 |
| GB | 2 444 364 A | 6/2008 | |
| JP | 05-148446 A | 6/1993 | |
| JP | 2001-220546 A | 8/2001 | |
| WO | WO-2006/070960 A1 | 7/2006 | |
| WO | 2009/018264 A2 | 2/2009 | |

\* cited by examiner

FAST DRYING, HIGH BUILD, SAG-RESISTANT COMPOSITIONS, COATINGS, TWO-COMPONENT PACK AND COATING PROCESS

CROSS-REFERENCE TO RELATED APPLICATIONS

This application is a U.S. National Phase Application under 35 U.S.C. § 371 of International Application No. PCT/US2018/060725, filed on Nov. 13, 2018, which claims the benefit of priority to U.S. Patent Application No. 62/585,804, filed on Nov. 14, 2017, and to U.S. Patent Application No. 62/680,321, filed on Jun. 4, 2018, the contents of which are incorporated herein in their entirety.

FIELD

The present technology is generally related to intumescent, vibration damping (i.e., sound damping), and insulative compositions and/or coatings, and methods of making and using the same.

BACKGROUND

Intumescent coatings are commonly used to protect a substrate (e.g., commercial and residential structures) from the effects of fire and prolong the time until the substrate reaches critical failure temperature. Intumescent agents/materials are substances that expand on exposure to heat to produce an insulating foam or "char." The heat can be generated from any type of fire condition including cellulosic, hydrocarbon and/or Jetfire conditions. Chars have low thermal conductivity and a volume many times that of the original coating. The volume expansion and charring protects any underlying substrate as the char acts as a poor conductor of heat and, as such, reduces the rate of heating experienced by the substrate. The char thus extends the time before the substrate loses its integrity and the building/structure collapses, thereby allowing additional time for safe evacuation. Accordingly, intumescent coatings are used in passive fire protection and are applied to substrates as fire retardant coatings to improve fire resistance. Such coatings are useful to provide retardant barriers in many construction applications, for example in steel and/or concrete structures.

To decrease noise generated by vibrations (e.g., in vehicles, appliances and machinery), sound damping materials are applied to the vibrating areas to effectively dissipate the vibrational energy. Applying mastic or asphaltic pads to the vibrating surfaces can dissipate some of the vibrational energy, but this process is labor intensive in the application and expensive as complicated shapes must be produced to cover the critical areas. Vibration damping coatings which are epoxy or PVC based are also used yet these are expensive and contain volatile organic compounds which can create a hazard when applying the coating.

Insulation materials are applied to cavities, piping, and structures. Commonly, insulations materials are applied for thermal insulation. Fiberglass insulation has been widely accepted for residential and light commercial construction. Fiberglass insulation products are made in a variety of configurations; however, in many applications this insulation technique does reach its optimal thermal performance due to air infiltration that may also allow water condensation. To overcome this deficiency, spray-on polyurethane foam insulation materials have been developed. However, like vibration damping coatings, these materials are often expensive and contain volatile organic compounds which can create a hazard when applying the coating.

The formation of intumescent, vibration damping, and insulation coatings on exterior surfaces and/or vertical surfaces also pose numerous challenges. Notably, coatings on exterior surfaces typically remain exposed to the elements during application and drying. As a result, weather conditions during coating application and drying can impact the quality of exterior coatings. For example, rainfall during and/or after coating applications can wash-off some or all of the coating, resulting in coating failure. By shortening the setting time of coatings, instances of coating failure, such as those due to unanticipated rainfall, can be minimized. Further, previously used intumescent, vibration damping, and insulation coatings often cannot be applied in a single coat to achieve the desired film thickness due to film cracking upon curing, and as a result such coatings are often applied in multiple coats resulting in increased labor costs. In certain applications, external methods of accelerating the curing of these coatings are employed, such as dryers to speed up the curing process resulting in increased energy costs. It would be desirable to achieve intumescent, vibration damping, and insulation coatings that, upon application, quickly form a dry-to-touch and water resistant film without sag and high film builds.

SUMMARY

The present technology provides a composition that includes a first composition that includes a polymeric binder that includes a hyperbranched polymer or a polymer comprising a covalently bonded surfactant, a second composition that includes a coagulating agent, and an additive that includes an intumescent agent, a vibration damping agent, an insulation agent, or a combination of two or more thereof wherein the additive is present in the first composition, the second composition, or both the first and second compositions, the intumescent agent includes an acid source, a carbon source, and a gas forming agent, the vibration damping agent comprises a first filler, the insulation agent comprises a second filler; and the first composition and the second composition are configured to form a coating within 30 seconds of application to a substrate, and the coating is non-sagging, water-resistant, and dry-to-the touch. The composition is suitable for deposition onto a substrate in need of improved fire resistance, vibration damping, or insulation. In some embodiments, the substrate may be a substrate utilized in the construction industry to provide passive fire protection/resistance; the substrate may be a vibrating area of a vehicle, appliance, or machinery in need of vibrational energy damping; the substrate may be a residential or commercial building, vehicle, or airplane in need of insulation including thermal insulation.

In some embodiments, the hyperbranched polymer may include the reaction product of an acid-functional resin and an epoxy; wherein the hyperbranched polymer comprises a carboxyl, a hydroxyl, an amino, a uredo, an acetoacetoxy, a diacetone, or a combination of any two or more thereof. In some embodiments, the acid-functional resin may be a partially neutralized, acid-functional resin; wherein the partially neutralized, acid functional resin is the reaction product of the acid-functional resin and at least a functionalized amine.

In some embodiments, the polymer that includes a covalently bonded surfactant includes one or more polymerized monomers including acrylic acid, methacrylic acid, alkyl acrylate, alkyl methacrylate, acrylonitrile, styrene, vinyl containing monomers, or a combination of any two or more thereof. The surfactant may be an anionic surfactant. In some embodiments, the surfactant may include a sulfate group. Prior to covalently bonding to the polymer, the surfactant may include an allyl or vinyl group. In some embodiments, the surfactant may include a polyoxyalkyl group (e.g., polyoxyethylene or polyoxypropylene). In some embodiments, the surfactant may include an aromatic group such as a phenyl group.

The present technology also provides a process for forming the composition, coating, 2-pack coating kits that include the composition, and a method of producing the coating.

DETAILED DESCRIPTION

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

In general, "substituted" refers to an alkyl, alkenyl, alkynyl, aryl, or ether group, as defined below (e.g., an alkyl group) in which one or more bonds to a hydrogen atom contained therein are replaced by a bond to non-hydrogen or non-carbon atoms. Substituted groups also include groups in which one or more bonds to a carbon(s) or hydrogen(s) atom are replaced by one or more bonds, including double or triple bonds, to a heteroatom. Thus, a substituted group will be substituted with one or more substituents, unless otherwise specified. In some embodiments, a substituted group is substituted with 1, 2, 3, 4, 5, or 6 substituents. Examples of substituent groups include: halogens (i.e., F, Cl, Br, and I); hydroxyls; alkoxy, alkenoxy, alkynoxy, aryloxy, aralkyloxy, heterocyclyloxy, and heterocyclylalkoxy groups; carbonyls (oxo); carboxyls; esters; urethanes; oximes; hydroxylamines; alkoxyamines; aralkoxyamines; thiols; sulfides; sulfoxides; sulfones; sulfonyls; sulfonamides; amines; N-oxides; hydrazines; hydrazides; hydrazones; azides; amides; ureas; amidines; guanidines; enamines; imides; isocyanates; isothiocyanates; cyanates; thiocyanates; imines; nitro groups; nitriles (i.e., CN); and the like.

As used herein, "alkyl" groups include straight chain and branched alkyl groups having from 1 to about 20 carbon atoms, and typically from 1 to 12 carbons or, in some embodiments, from 1 to 8 carbon atoms. As employed herein, "alkyl groups" include cycloalkyl groups as defined below. Alkyl groups may be substituted or unsubstituted. Examples of straight chain alkyl groups include methyl, ethyl, n-propyl, n-butyl, n-pentyl, n-hexyl, n-heptyl, and n-octyl groups. Examples of branched alkyl groups include, but are not limited to, isopropyl, sec-butyl, t-butyl, neopentyl, and isopentyl groups. Representative substituted alkyl groups may be substituted one or more times with, for example, amino, thio, hydroxy, cyano, alkoxy, and/or halo groups such as F, Cl, Br, and I groups. As used herein the term haloalkyl is an alkyl group having one or more halo groups. In some embodiments, haloalkyl refers to a per-haloalkyl group.

Cycloalkyl groups are cyclic alkyl groups such as, but not limited to, cyclopropyl, cyclobutyl, cyclopentyl, cyclohexyl, cycloheptyl, and cyclooctyl groups. In some embodiments, the cycloalkyl group has 3 to 8 ring members, whereas in other embodiments the number of ring carbon atoms range from 3 to 5, 6, or 7. Cycloalkyl groups may be substituted or unsubstituted. Cycloalkyl groups further include polycyclic cycloalkyl groups such as, but not limited to, norbornyl, adamantyl, bornyl, camphenyl, isocamphenyl, and carenyl groups, and fused rings such as, but not limited to, decalinyl, and the like. Cycloalkyl groups also include rings that are substituted with straight or branched chain alkyl groups as defined above. Representative substituted cycloalkyl groups may be mono-substituted or substituted more than once, such as, but not limited to: 2,2-; 2,3-; 2,4-; 2,5-; or 2,6-disubstituted cyclohexyl groups or mono-, di-, or tri-substituted norbornyl or cycloheptyl groups, which may be substituted with, for example, alkyl, alkoxy, amino, thio, hydroxy, cyano, and/or halo groups.

Alkenyl groups are straight chain, branched or cyclic alkyl groups having 2 to about 20 carbon atoms, and further including at least one double bond. In some embodiments alkenyl groups have from 1 to 12 carbons, or, typically, from 1 to 8 carbon atoms. Alkenyl groups may be substituted or unsubstituted. Alkenyl groups include, for instance, vinyl, propenyl, 2-butenyl, 3-butenyl, isobutenyl, cyclohexenyl, cyclopentenyl, cyclohexadienyl, butadienyl, pentadienyl, and hexadienyl groups among others. Alkenyl groups may be substituted similarly to alkyl groups. Divalent alkenyl groups, i.e., alkenyl groups with two points of attachment, include, but are not limited to, CH—CH=CH$_2$, C=CH$_2$, or C=CHCH$_3$.

As used herein, "aryl", or "aromatic," groups are cyclic aromatic hydrocarbons that do not contain heteroatoms. Aryl groups include monocyclic, bicyclic and polycyclic ring systems. Thus, aryl groups include, but are not limited to, phenyl, azulenyl, heptalenyl, biphenylenyl, indacenyl, fluorenyl, phenanthrenyl, triphenylenyl, pyrenyl, naphthacenyl, chrysenyl, biphenyl, anthracenyl, indenyl, indanyl, pentalenyl, and naphthyl groups. In some embodiments, aryl groups contain 6-14 carbons, and in others from 6 to 12 or even 6-10 carbon atoms in the ring portions of the groups. The phrase "aryl groups" includes groups containing fused rings, such as fused aromatic-aliphatic ring systems (e.g., indanyl, tetrahydronaphthyl, and the like). Aryl groups may be substituted or unsubstituted.

As used herein, the term "hyperbranched polymer" refers to a polymer having a main polymer chain and at least two branching points along the main polymer chain that may also themselves have further branching points.

As used herein, the term "microgel" refers to dispersions of polymeric particles which are internally crosslinked without any significant amount of crosslinking in the continuous phase so as to provide dispersions with lower viscosity and higher solids content. Commonly, microgels form a continuous network upon film formation.

As used herein, "anti-sag," "anti-sagging," or "without sagging" refers to the ability to apply the composition to a vertical surface of a substrate in dry film thickness that ranges from about 1 mil to about 1000 mils without the coating sagging.

As used herein, the term "fast dry" or "fast drying" refers to the ability to touch the coating within 30 seconds after application to a substrate surface of the composition without any coating transfer to the touching object.

As used herein, the terms "crosslink" and "cure" refer to the toughening or hardening of the composition by reactive crosslinking of the composition components. In some embodiments, the composition may form a fully cured coating in less than 48, less than 36, less than 24, less than 12 hours, less than 10 hours, less than 8 hours, less than 6 hours, or less than 4 hours.

As use herein, "heat" refers to a type of energy transfer in which energy flows from a warmer substance or object to a colder one. Transfer of energy as heat can occur through direct contact, a barrier that is impermeable to matter (e.g., conduction), radiation, intermediate fluid, or by a combination of two of more.

As use herein, an "intumescent coating" is a coating that swells as a result of heat exposure, thereby increasing in volume and decreasing in density. Commonly, the intumescent coating may provide fire protection to the coated substrate and the structure in which the substrate is attached. Typically, the fire protection is passive fire protection.

As used herein, the term "flame retardant" is a material that inhibits or delays the spread of fire by suppressing the chemical reactions in the flame, or by the formation of a protective layer on the surface of a substrate. Flame retardants may be mixed with a base material (such mixtures may be referred to as "additive flame retardants"), or chemically bonded to the base material (such compounds may be referred to as "reactive flame retardants").

As used herein, the term "vibration damping coating" is a coating that damps mechanical vibration of an article of manufacture that includes a source of mechanical vibration. The vibration damping coating may be provided using a liquid-applied sound dampening ("LASD") composition.

As used herein, the term "insulative coating" is a coating that insulates a residential or commercial building, vehicle, or airplane. In some embodiments, the coating may provide thermal and/or moisture insulation. The insulation coating may be applied to any area in need of insulating. For example, the insulative coating may be applied in wall spaces of residential and commercial buildings.

The present technology provides compositions that include a first and second composition, which upon sequential or simultaneous application to a substrate are configured to form a coating within 30 seconds of application, and the coating is non-sagging, water-resistant, and dry-to-the touch. The compositions include a first composition that includes a polymeric binder, a second composition that includes a coagulating agent, and an additive that is present in the first composition and/or the second composition. The coating provides fire resistance and/or fire retardance, vibrational damping, and/or insulation.

In one aspect, the present technology provides a composition that includes a first composition that includes a polymeric binder that includes a hyperbranched polymer or a polymer comprising a covalently bonded surfactant, a second composition that includes a coagulating agent, and an additive that includes an intumescent agent, a vibration damping agent, an insulation agent, or a combination of two or more thereof; wherein the additive is present in the first composition, the second composition, or both the first and second compositions, the intumescent agent includes an acid source, a carbon source, and a gas forming agent, the vibration damping agent comprises a first filler, the insulation agent comprises a second filler; and the first composition and the second composition are configured to form a coating within 30 seconds of application to a substrate, and the coating is non-sagging, water-resistant, and dry-to-the touch.

In some embodiments, the coating has a dry film thickness of about 5 μm to about 5 cm. In some embodiments, the coating has a dry film thickness of about 100 μm to about 4 cm, about 120 μm to about 3 cm, about 140 μm to about 2.5 cm, about 150 μm to about 2 cm, or about 200 μm to about 1.5 cm. One or more layers of the composition may be applied to a substrate. In some embodiments, the composition may be applied to a substrate as a single layer or as part of a multi-layer system. In certain aspects, the composition may be applied on top of a primer or as the primer layer itself. In some embodiments, the composition may form a top coat layer.

In some embodiments, the acid source may include melamine phosphate, magnesium phosphate, boric acid and ammonium poly-phosphate, polyphosphoric acid, or a combination of any two or more thereof. In some embodiments, the acid source may be present at about 5 wt % to about 40 wt %, based on a total weight of the composition. In some embodiments, the acid source may be present at about 15 wt % to about 40 wt %, about 15 wt % to about 35 wt %, about 15 wt % to about 30 wt %, or about 15 wt % to about 25 wt %, based on a total weight of the composition.

The carbon source may be a compound, a salt, a complex, or composition capable of generating or decomposing or intumescing into char at an elevated temperature. In some embodiments, the carbon source may include a mono- or poly-substituted long chain hydrocarbon. For example, the carbon source may include a mono- or poly-substituted $C_4$-$C_{20}$ hydrocarbon chain including mono- or poly-substituted $C_5$-$C_{12}$ hydrocarbon chains. The hydrocarbon chain may be branched or linear, saturated or unsaturated, acyclic or cyclic. Preferable substituents include hydroxyl and/or alkoxy groups. In some embodiments, the carbon source may include a $C_4$-$C_{20}$ alcohol, a polyol compound, a polyhydroxylated $C_4$-$C_{20}$ alkyl group, or a combination of any two or more thereof. In some embodiments, the carbon source may include pentaerythritol, dipentaerythritol, tripentaerythritol, starch, polyol compounds, sugars, expanding graphite, cellulose acetate, or a combination of any two or more thereof. In some embodiments, the carbon source may be present at about 1 wt % to about 40 wt %, based on a total weight of the composition. In some embodiments, the carbon source may be present at about 4 wt % to about 40 wt %, about 4 wt % to about 35 wt %, about 4 wt % to about 30 wt %, or about 4 wt % to about 25 wt %, based on a total weight of the composition.

The gas forming agent may include melamine, melamine derivative, a nitrogenous derivative, a phosphorus-containing derivative, or a combination of any two or more thereof. In some embodiments, the melamine derivative may be a salt. In some embodiments, the gas forming agent may include melamine, melamine cyanurate, melamine borate, melamine phosphate, tris-(hydroxyethyl) isocyanurate, melamine polyphosphate, chlorinated paraffin, or a combination of any two or more thereof. In some embodiments, the gas forming agent may be present at about 1 wt % to about 40 wt %, based on a total weight of the composition. In some embodiments, the gas forming agent may be present at about 5 wt % to about 40 wt %, about 5 wt % to about 35 wt %, about 5 wt % to about 30 wt %, about 5 wt % to about 25 wt %, or about 5 wt % to about 20 wt %, based on a total weight of the composition.

The first filler may include a mineral filler, polymeric plastic filler, or a combination thereof. In some embodiments, the mineral filler may include an alkaline earth metal carbonate. In some embodiments, the mineral filler may include calcium carbonate (e.g., ground or precipitated), mica, diatomaceous earth, zeolite, graphite, kaolin, clay (e.g., calcined, delaminated, or structured), glass flake, Hine, caolinite, titanium dioxide, calcium silicate, aluminum silicate, magnesium silicate, wollastonite, zinc oxide, iron oxide, magnesium carbonate, amorphous silica, zinc hydroxide, aluminum oxide, aluminum hydroxide, talc, satin white, barium sulfate, calcium sulfate, or a combination of two or more thereof. In some embodiments, the polymeric plastic filler is non-coalescing (at least at temperature of use). In some embodiments, the polymeric plastic filler may include solid bead, voided, multi-voided, binder-coated, charged, or a combination of two or more thereof. In some embodiments, the first filler may include a recycled alkaline earth metal carbonate as provided in PCT/US2017/063570 (incorporated herein). In some embodiments, the first filler may include spent calcium carbonate.

In some embodiments, the first filler may be present at about 15 wt % to about 80 wt %. This may include, but is not limited to, from about 20 wt % to about 70 wt %; from about 25 wt % to about 70 wt %; from about 40 wt % to about 70 wt %; or from about 50 wt % to about 65 wt %, based on a total weight of the composition.

The composition may exhibit a sound damping property as measured by a composite loss factor of from about 0.13 to about 0.40 (including about 0.15 to about 0.35, about 0.20 to about 0.30, or about 0.30 to about 0.40) at a frequency of 200 Hz and at a temperature of from about 20° C. to about 30° C.

The second filler may include balsa wood, calcium silicate, cellulose, chalk, cork board, cork regranulated, cotton, cotton wool, diatomaceous earth, felt insulation, fiberglass, foam glass, glass wool, hairfelt, kapok insulation, magnesia insulation, mineral wool insulation, paper, peat, foamed plastics, polypropylene, polyethylene, polyurethane, rock wool, sheep wool, silica aerogel, slag wool, polystyrene, vermiculite, wax, perlite, rice hulls, hollow glass spheres, hollow ceramic spheres, alumina-silica fibers, alumina-silica-zirconia fibers, polycrystalline mullite fibers, calcium-alumino-silicate fibers, alumina fibers, mineral fibers, or a combination of two or more thereof. In some embodiments, the second filler may include a ceramic fiber such as alumina-silica fibers, alumina-silica-zirconia fibers, polycrystalline mullite fibers, calcium-alumino-silicate fibers, alumina fibers and mineral fibers. In some embodiments, the second filler may include glass such as fiberglass, foam glass, glass wool, hollow glass spheres, or hollow ceramic spheres. In some embodiments, the second filler may include hollow glass spheres.

In some embodiments, the second filler may be present at about 15 wt % to about 80 wt %. This may include, but is not limited to, from about 15 wt % to about 70 wt %; from about 15 wt % to about 65 wt %; from about 15 wt % to about 50 wt %; or from about 20 wt % to about 40 wt %, based on a total weight of the composition.

The composition may exhibit a thermal conductivity as measured according to ASTM C-518 of from about 0.020 N/mK to about 0.065 N/mK including about 0.040 N/mK to about 0.062 N/mK or about 0.053 N/mK to about 0.059 N/mK.

In some embodiments, the composition may further include sound deadening materials and aqueous compositions that may be spray applied or otherwise applied to building substrates to provide improved sound deadening properties. For example, the sound deadening materials may be used in building and construction applications where impact and/or airborne noise abatement is desirable, such as in doors, roofs, walls, floors, and ceilings. Particular uses may include incorporating the sound deadening materials in gypsum underlayment systems, such as floor/ceiling assemblies in multifamily or commercial buildings.

In some embodiments, the sound deadening materials include an acrylic polymer polymerization product of a molten resin mixture that includes at least one acrylic monomer, a polymerization initiator present in a molar ratio of the polymerization initiator to the at least one acrylic monomer from about 0.0005:1 to about 0.06:1, and from 0 to about 25 wt % of a reaction solvent based on the weight of acrylic monomers, wherein the acrylic polymer polymerization product includes unreacted acrylic monomers and the acrylic polymer product.

In some embodiments, the at least one acrylic monomer may include acrylic monomers as described herein in any embodiment. In some embodiments, the at least one acrylic monomer includes, but is not limited to, acrylic acid, methacrylic acid, chloroacrylic acid, ethacrylic acid, crotonic acid, itaconic acid, sorbic acid, cinnamic acid, citraconic acid, mesaconic acid, maleic acid, fumaric acid, sodium-2-sulfoethyl acrylate, sodium N-(1,1-dimethyl-2-sulfoethyl) acrylamide, or 3-acrylamido-3-methylbutanoic acid, 2-hydroxyethyl acrylate, 2-hydroxyethyl methacrylate, 2, 3-hydroxypropyl acrylate, 2, 3-hydroxypropyl methacrylate, 2,4-hydroxybutyl acrylate, 2, 4-hydroxybutyl methacrylates, methyl acrylate, ethyl acrylate, n-propyl acrylate, i-propyl acrylate, n-butyl acrylate, s-butyl acrylate, i-butyl acrylate, t-butyl acrylate, n-amyl acrylate, i-amyl acrylate, isobornyl acrylate, n-hexyl acrylate, 2-ethylbutyl acrylate, 2-ethylhexyl acrylate, n-octyl acrylate, n-decyl acrylate, methylcyclohexyl acrylate, cyclopentyl acrylate, cyclohexyl acrylate, methyl methacrylate, ethyl methacrylate, 2-hydroxyethyl methacrylate, n-propyl methacrylate, n-butyl methacrylate, i-propyl methacrylate, i-butyl methacrylate, n-amyl methacrylate, n-hexyl methacrylate, i-amyl methacrylate, s-butyl-methacrylate, t-butyl methacrylate, 2-ethylbutyl methacrylate, methylcyclohexyl methacrylate, cinnamyl methacrylate, crotyl methacrylate, cyclohexyl methacrylate, cyclopentyl methacrylate, 2-ethoxyethyl methacrylate, or isobornyl methacrylate.

In some embodiments, the at least one acrylic monomer further includes at least one latent crosslinking monomer. As used herein, "latent crosslinking capability" refers to the ability of one or more types of functionalities on the polymer backbone to further react and create covalent bonds upon application and water evaporation from the acrylic polymer polymerization product. Such latent crosslinking monomers include, but are not limited to, monomers with reactive keto groups such as diacetone acrylamide (DAAM), diacetone methacrylamide, vinylacetoacetate, acrolein, and methacrolein. In some embodiments, the molten resin mixture may further comprise one or more styrenic monomers. Suitable styrenic monomers may include, but are not limited to, styrene, α-methyl styrene, ethyl styrene, isopropyl styrene, and tertiary-butyl styrene.

In some embodiments, when the polymer backbone of the acrylic polymer polymerization product that includes polymerized latent crosslinking monomers, the acrylic polymer may further include a crosslinking agent. Suitable crosslinking agents may include, but are not limited to, a polyamine, a polyhydrazide, a hydrazine (e.g., adipic acid dihydrazide), or a mixture of two or more thereof. In some embodiments, the crosslinking agent for reaction with the latent crosslinking monomer functionalities may be present in an amount necessary to achieve a desired degree of cure (i.e., crosslinking). For example, the crosslinking agent may be present at a level to provide at least about 0.1 equivalent for each equivalent of latent crosslinking functionality. In some embodiments, the crosslinking agent may be present at a level to provide between about 0.2 to about 2.0 equivalents for each equivalent of latent crosslinking functionality. In some embodiments, the crosslinking agent may be present at a level to provide about 0.4 to about 1.2 equivalents for each equivalent of latent crosslinking functionality. In some embodiments, the crosslinking agent may be present at a level to provide about 0.4 to about 1.0 equivalent for each equivalent of latent crosslinking functionality.

In some embodiments, the polymerization initiators may include compounds which decompose thermally into radicals in a first order reaction, although this is not a critical factor. In some embodiments, the polymerization initiators may exhibit a suitable half-life decomposition temperature appropriate for the chosen reaction temperature and residence time. In some embodiments, the polymerization initiator may be a thermal initiator. Suitable polymerization initiators may include, but are not limited to, 2,2'-azodi-(2, 4-dimethylvaleronitrile), 2,2-azobisisobutyronitrile (AIBN), 2,2'-azobis(2-methylbutyronitrile), 1,1'-azobis (cyclohexane-1-carbonitrile), tert-butylperbenzoate, tertamyl peroxy-2-ethylhexyl carbonate, 1, 1-bis(tert-amylperoxy)cyclohexane, tertamylperoxy-2-ethylhexanoate, tert-amylperoxyacetate, tert-butylperoxyacetate, tert-butylperoxybenzoate (TBPB), 2,5-di-(tert-butylperoxy)-2,5-dimethylhexane, di-tert-amyl peroxide (DTAP), di-tert-butylperoxide (DTBP), lauryl peroxide, dilauryl peroxide (DLP), succinic acid peroxide; or benzoyl peroxide. The polymerization initiator may be present in a molar ratio of the polymerization monomer to the at least one acrylic monomer from about 0.0005:1 to about 0.06:1. Suitable molar ratios include, but are not limited to, from about 0.0005:1, about 0.0006:1, about 0.0007:1, about 0.0008:1, about 0.0009:1, about 0.001:1, about 0.002:1, about 0.003:1, about 0.004:1, about 0.005:1, about 0.006:1, about 0.007:1, about 0.008:1, about 0.009:1, about 0.01:1, about 0.02:1, about 0.03:1, about 0.04:1, about 0.05:1, about 0.06:1, or any range including and/or in between any two of the preceding values.

In some embodiments, the molten reaction mixture includes a reaction solvent. Suitable reaction solvents include, but are not limited to, water, acetone, or other water compatible solvents. Suitable amounts of the reaction solvent present may include, but are not limited to, 0 wt %, about 1 wt %, about 2 wt %, about 3 wt %, about 4 wt %, about 5 wt %, about 6 wt %, about 7 wt %, about 8 wt %, about 9 wt %, about 10 wt %, about 11 wt %, about 12 wt %, about 13 wt %, about 14 wt %, about 15 wt %, about 16 wt %, about 17 wt %, about 18 wt %, about 19 wt %, about 20 wt %, about 21 wt %, about 22 wt %, about 23 wt %, about 24 wt %, about 25 wt % (based on the weight of acrylic monomers) or any range including and/or in between any two of the preceding values.

In some embodiments, the acrylic polymer polymerization product may have a polydispersity ratio of less than about 3. For example, the acrylic polymer polymerization product may have a polydispersity ratio of less than about 3.0, about 2.9, about 2.8, about 2.7, about 2.6, about 2.5, about 2.4, about 2.3, about 2.2, about 2.1, about 2.0, about 1.9, about 1.8, about 1.7, about 1.6, about 1.5, about 1.4, about 1.3, about 1.2, about 1.1, about 1.0, about 0.9, about 0.8, about 0.7, about 0.6, about 0.5, or any range including and/or in between any two of the preceding values.

In some embodiments, the acrylic polymer polymerization product has a number average molecular weight ($M_n$) of about 1000 g/mol to about 10,000 g/mol. Suitable number average molecular weights ($M_n$) may include, but are not limited to, about 1000 g/mol, about 1200 g/mol, about 1400 g/mol, about 1600 g/mol, about 1800 g/mol, about 2000 g/mol, about 2200 g/mol, about 2400 g/mol, about 2600 g/mol, about 2800 g/mol, about 3000 g/mol, about 3200 g/mol, about 3400 g/mol, about 3600 g/mol, about 3800 g/mol, about 4000 g/mol, about 4200 g/mol, about 4400 g/mol, about 4600 g/mol, about 4800 g/mol, about 5000 g/mol, about 5200 g/mol, about 5400 g/mol, about 5600 g/mol, about 5800 g/mol, about 6000 g/mol, about 6200 g/mol, about 6400 g/mol, about 6600 g/mol, about 6800 g/mol, about 7000 g/mol, about 7200 g/mol, about 7400 g/mol, about 7600 g/mol, about 7800 g/mol, about 8000 g/mol, about 8200 g/mol, about 8400 g/mol, about 8600 g/mol, about 8800 g/mol, about 9000 g/mol, about 9200 g/mol, about 9400 g/mol, about 9600 g/mol, about 9800 g/mol, about 10,000 g/mol, or any range including and/or in between any two of the preceding values. In some embodiments, the acrylic polymer polymerization product has a $M_n$ of about 1000 g/mol to about 2500 g/mol, about 1000 g/mol to about 3500 g/mol, about 1000 g/mol to about 5000 g/mol, about 1000 g/mol to about 7500 g/mol, or about 1000 g/mol to about 10,000 g/mol.

In some embodiments, polymerization of the sound deadening material includes a continuous bulk polymerization process which includes: charging the molten resin mixture as described herein in any embodiment into a continuous mixed reactor zone; maintaining a flow rate of the molten resin mixture through the reaction zone; and maintaining the molten resin mixture at an elevated temperature in a range from about 180° C. to about 270° C.

In some embodiments, the flow rate provides a residence time of the charged molten resin mixture in the reaction zone from about 1 to about 30 min. Suitable residence times include, but are not limited to, about 1 min, about 2 min, about 3 min, about 4 min, about 5 min, about 6 min, about 7 min, about 8 min, about 9 min, about 10 min, about 11 min, about 12 min, about 13 min, about 14 min, about 15 min, about 16 min, about 17 min, about 18 min, about 19 min, about 20 min, about 21 min, about 22 min, about 23 min, about 24 min, about 25 min, about 26 min, about 27 min, about 28 min, about 29 min, about 30 min, or any range including and/or in between any two of the preceding values. In some embodiments, the flow rate may be suitable for maintaining a predetermined level of a reaction mixture in the reaction zone.

In some embodiments, the process includes maintaining the molten resin mixture at an elevated temperature from about 180° C. to about 270° C. Suitable temperatures include, but are not limited to, about 180° C., about 190° C., about 200° C., about 210° C., about 220° C., about 230° C., about 240° C., about 250° C., about 260° C., about 270° C., or any range including and/or in between any two of the preceding value. In some embodiments, the elevated temperature may be sufficient to provide accelerated conversion to the acrylic polymer polymerization product. For example, the elevated temperature is sufficient to provide accelerated conversion to the acrylic polymer product, wherein the acrylic polymerization product is a readily processable, uniform, and concentrated polymer product.

In some embodiments, the sound deadening material may be prepared via a high temperature, continuous polymerization process as described in U.S. Pat. Nos. 4,546,160, 4,414,370, or 4,529,787 (each of which is herein incorporated by reference).

In some embodiments, the composition may exhibit sound attenuation properties including, but not limited to, a minimum Impact Insulation Class (IIC) rating of about 50, as measured according to ASTM E989, and/or a minimum Impact Insulation Class Field rating of 45, as measured according to ASTM 1007. For example, the composition may exhibit sound attenuation properties as described herein when applied to floor and/or ceiling assemblies. In some embodiments, the composition may be applied to a floor and/or ceiling assembly and may exhibit an IIC rating of about 45 or greater. In some embodiments, the composition may be applied to a floor and/or ceiling assembly and may exhibit an IIC rating from about 35 to about 55.

In some embodiments, the coagulating agent may include dialkylaminoalkyl (meth)acrylate polymers, hexosan polymers, montmorillonite-containing clay, chitosan, poly[oxyalkylene(dialkylimino)alkylene] polymers, epihalohydrin/dialkylamine polymers, poly diallydialkylammonium halide polymers, polyepiamines, dialkylamine epihalohydrin containing electrolytes, dialkylamine-epihalohydrin-alkylenediamine polymer containing halides, dimethylaminoethylmethacrylate sulfuric acid salt, dimethylaminoethylmethacrylate methyl chloride quaternary ammonium salt, dimethylaminoethylmethacrylate methyl sulfate quaternary ammonium salt, dimethylaminoethylacrylate methyl chloride quaternary ammonium salt, acrylamidopropyltrimethyl ammonium chloride, aluminum chlorohydrate, aluminum sulfate, zinc chloride, ferric chloride, calcium chloride, magnesium hydroxide, calcium propionate, calcium polyphosphate, potassium tripolyphosphate, zinc ammonium bicarbonate, zinc ammonium nitrate, zinc ammonium acetate, sodium chloride, potassium chloride, potassium bromide, sodium sulfate, magnesium sulfate, copper sulfate, zinc sulfate, ferric sulfate, ferrous sulfate, magnesium chloride, magnesium carbonate, alum, calcium primary phosphate, magnesium primary phosphate, zinc primary phosphate, calcium pantothenate, glycine calcium salt, alanine calcium salt, serine calcium salt, threonine calcium salt, methionine calcium salt, phenylalanine calcium salt, calcium aspartate, sodium oxalate, calcium acetate, magnesium acetate, calcium pantothenate, glycine calcium salt, alanine calcium salt, serine calcium salt, threonine calcium salt, methionine calcium salt, phenylalanine calcium salt, calcium aspartate, polyphosphoric acid, or a combination of any two or more thereof. In some embodiments, the coagulating agent may be present at about 0.01 wt % to about 20 wt %, based on a total weight of the first composition. In some embodiments, the coagulating agent may be present at about 0.1 wt % to about 20 wt %, about 1 wt % to about 15 wt %, about 1 wt % to about 10 wt %, about 1 wt % to about 5 wt %, or about 0.1 wt % to about 5 wt %, based on a total weight of the first composition. In some embodiments, the coagulating agent may be present at about 0.01 wt % to about 20 wt %, based on a total weight of the second composition. In some embodiments, the coagulating agent may be present at about 0.1 wt % to about 20 wt %, about 1 wt % to about 15 wt %, about 1 wt % to about 10 wt %, about 1 wt % to about 5 wt %, or about 0.1 wt % to about 5 wt %, based on a total weight of the second composition. In some embodiments, the coagulating agent may be present at about 0.01 wt % to about 20 wt %, based on a total weight of the composition. In some embodiments, the coagulating agent may be present at about 0.1 wt % to about 20 wt %, about 1 wt % to about 15 wt %, about 1 wt % to about 10 wt %, about 1 wt % to about 5 wt %, or about 0.1 wt % to about 5 wt %, based on a total weight of the composition.

In some embodiments, the hyperbranched polymer may include the reaction product of an acid-functional resin and an epoxy; wherein the hyperbranched polymer comprises a carboxyl group, a hydroxyl group, an amino group, a uredo group, an acetoacetoxy group, a diacetone group, or a combination of any two or more thereof. In some embodiments, the hyperbranched polymer includes one or more hydroxyl groups.

In some embodiments, the acid-functional resin may be a partially neutralized, acid-functional resin; wherein the partially neutralized, acid functional resin is the reaction product of the acid-functional resin and at least a functionalized amine. In some embodiments, the acid groups on the acid-functional resin are at least partially neutralized before the acid groups on the acid-functional resin are bonded to the epoxy. In some embodiments, at least about 5 mol % of the acid groups on the acid-functional resin are neutralized. In some embodiments, up to about 95 mol % of the acid groups on the acid-functional resin are bonded to the epoxy.

The acid-functional resin may include an acid functional acrylic resin, a styrene-acrylic resin, a non-acrylic acid functional resin, a hybrid acrylic acid-functional resin, an acid functional polyester, an acid functional polyamide, an acid functional wax, or a hybrid copolymer thereof. Hybrid resins include copolymers (e.g., block copolymers) that include two or more covalently bonded homopolymers or copolymers. In some embodiments, the acid-functional resin may include one or more polymerized monomers selected from the group consisting of 2-hydroxyethyl acrylate, 2-hydroxyethyl methacrylate, 2, 3-hydroxypropyl acrylate, 2, 3-hydroxypropyl methacrylate, 2,4-hydroxybutyl acrylate, 2, 4-hydroxybutyl methacrylates, methyl acrylate, ethyl acrylate, n-propyl acrylate, i-propyl acrylate, n-butyl acrylate, s-butyl acrylate, i-butyl acrylate, t-butyl acrylate, n-amyl acrylate, i-amyl acrylate, isobornyl acrylate, n-hexyl acrylate, 2-ethylbutyl acrylate, 2-ethylhexyl acrylate, n-octyl acrylate, n-decyl acrylate, methylcyclohexyl acrylate, cyclopentyl acrylate, cyclohexyl acrylate, methyl methacrylate, ethyl methacrylate, 2-hydroxyethyl methacrylate, n-propyl methacrylate, n-butyl methacrylate, i-propyl methacrylate, i-butyl methacrylate, n-amyl methacrylate, n-hexyl methacrylate, i-amyl methacrylate, s-butyl-methacrylate, t-butyl methacrylate, 2-ethylbutyl methacrylate, methylcyclohexyl methacrylate, cinnamyl methacrylate, crotyl methacrylate, cyclohexyl methacrylate, cyclopentyl methacrylate, 2-ethoxyethyl methacrylate, and isobornyl methacrylate.

In some embodiments, the epoxy may have a plurality of epoxy groups. In some embodiments, the epoxy may include a polyepoxy-functional polymer, a monoepoxy-functional polymer, or a combination thereof. The polyepoxy-functional polymer may have an epoxy equivalent weight of about 100 Eq./kg to about 1000 Eq./kg. The polyepoxy-functional polymer may include a diglycidyl ester polymer, a glycidyl amine polymer, a cyclohexanedimethanol diglycidyl ether polymer, a polypropylene oxide diglycidyl ether polymer, a bisphenol A diglycidyl ether polymer, a bisphenol F diglycidyl ether polymer, or a mixture of any two or more thereof. The monoepoxy-functional polymer may include a glycidyl ether polymer, a glycidyl ester polymer, a glycidyl amine polymer, a glycidyl ester polymer, or a mixture of any two or more thereof. In some embodiments, the monoepoxy-functional polymer may include a glycidyl methacrylate, a glycidyl ester of neodecanoic acid, a biphenol A monoglycidyl ether, a 2-ethylhexyl glycidyl ether, or a mixture of any two or more thereof. The monoepoxy-functional polymer may include one or more hydroxyl groups.

In some embodiments, the functionalized amine includes a hydroxyl, cyano, carboxyl, nitro, heteroaryl group, or a combination of any two or more thereof. The functionalized amine may include a compound represented by Formula IA, Formula IIA, Formula IIIA, or a mixture of any two or more thereof:

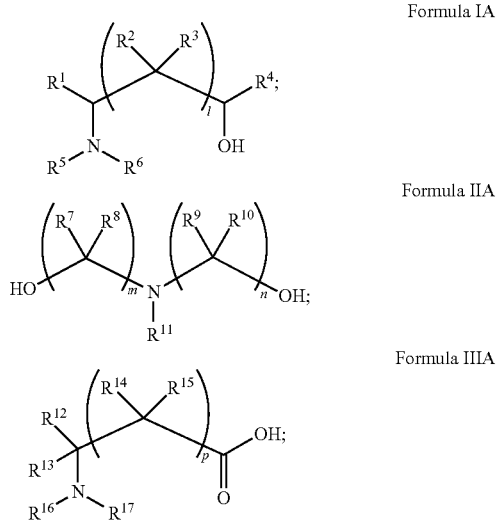

wherein: $R^1$, $R^2$, $R^3$, $R^4$, $R^5$, $R^6$, $R^7$, $R^8$, $R^9$, $R^{10}$, and $R^{11}$ are each independently a hydrogen or $C_1$-$C_6$ alkyl group; $R^{12}$, $R^{13}$, $R^{14}$, $R^{15}$ $R^{16}$, and $R^{17}$, are each independently a hydrogen, hydroxyl, halo, carboxyl, amido, ester, thiol, alkylthio, guanadino, or a $C_1$-$C_6$ alkyl, $C_3$-$C_{10}$ cycloalkyl, $C_3$-$C_{10}$ heterocycloalkyl, $C_5$-$C_{12}$ aryl, or $C_5$-$C_{12}$ heteroaryl group; l and p are each independently 0, 1, 2, 3, 4, or 5; and m and n are each independently 1, 2, 3, 4, or 5. In some embodiments, the functionalized amine includes ethanolamine, triethanolamine, 3-amino-1-propanol, amino-2-propanol, 4-amino-1-butanol, 3-amino-1-butanol, 2-amino-1-butanol, 5-amino-1-pentanol, methyldiethanolamine, dimethylethanolamine, or a mixture of any two or more thereof. In some embodiments, the functionalized amine includes ethanolamine, triethanolamine, methyldiethanolamine, dimethylethanolamine, or a mixture of any two or more thereof.

In some embodiments, the acid-functional resin includes the polymerization product of a mixture of monomers including a styrenic monomer and a monomer of formula V, maleic anhydride, itaconic acid, an ester of itaconic acid, or a mixture of any two or more thereof; wherein:

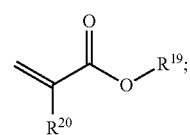

Formula V $R^{20}$ is hydrogen or $CH_3$; and $R^{19}$ is a hydrogen, alkyl, cycloalkyl, aryl, or alkaryl group. In some embodiments, $R^{19}$ may be a $C_1$-$C_{20}$ alkyl, a $C_3$-$C_{20}$ cycloalkyl, $C_5$-$C_{12}$ aryl, or a $C_5$-$C_{20}$ alkaryl group.

In some embodiments, the acid-functional resin has a number average molecular weight ($M_n$) of about 1000 g/mol to about 100,000 g/mol. In some embodiments, the acid-functional resin has a number average molecular weight ($M_n$) of about 1000 g/mol to about 10,000 g/mol. In some embodiments, the acid-functional resin has a number average molecular weight ($M_n$) of about 2500 g/mol up to the acid-functional resin gel point. In some embodiments, the acid-functional resin has a weight average molecular weight ($M_w$) of about 2000 g/mol to about 1,000,000 g/mol.

In some embodiments, the hyperbranched polymer has an acid number of about 15 mg KOH/g to about 300 mg KOH/g. In some embodiments, the hyperbranched polymer has an acid number of about 20 mg KOH/g to about 250 mg KOH/g. In some embodiments, the hyperbranched polymer has a hydroxyl number of about 1 mg KOH/g to about 300 mg KOH/g. In some embodiments, the hyperbranched polymer has a hydroxyl number of about 10 mg KOH/g to about 250 mg KOH/g.

In some embodiments, the hyperbranched polymer may be a microgel.

In some embodiments, the hyperbranched polymer may be any hyperbranched polymer disclosed in U.S. Pat. No. 7,887,626, RE 44,931, or PCT/US2017/057214 (each of which is herein incorporated by reference).

In some embodiments, the polymer that includes a covalently bonded surfactant includes one or more polymerized monomers including acrylic acid, methacrylic acid, alkyl acrylate, alkyl methacrylate, acrylonitrile, styrene, vinyl containing monomers, or a combination of any two or more thereof. In some embodiments, the one or more polymerized monomers include acrylic acid, methacrylic acid, $C_1$-$C_4$ alkyl acrylate, $C_1$-$C_4$ alkyl methacrylate, $C_1$-$C_4$ hydroxyalkyl acrylate, $C_1$-$C_4$ hydroxyalkyl methacrylate, acrylonitrile, styrene, vinyl containing monomers, or a combination of any two or more thereof. In some embodiments, the polymer that includes a covalently bonded surfactant may be a copolymer. In some embodiments, the polymer that includes a covalently bonded surfactant includes n-butyl acrylate-acrylonitrile-styrene copolymer, n-butyl acrylate-methylmethacrylate-methacrylic-hydroxymethacrylate-styrene copolymer, styrene-acrylic copolymer, styrene-butadiene copolymer, vinyl-acrylic copolymer, or a combination of any two or more thereof. In some embodiments, the polymer that includes a covalently bonded surfactant includes an acrylic polymer.

The covalently bonded surfactant may include an anionic surfactant. In some embodiments, the anionic surfactant may include a sulfate, sulfonate, carboxylate, or phosphate group. In some embodiments, the anionic surfactant may include a sulfate group.

Prior to covalently bonding to the polymer, the surfactant may include an allyl or vinyl group. In some embodiments, the surfactant may include a polyoxyalkyl group (e.g., polyoxyethylene or polyoxypropylene). In some embodiments, the surfactant may include an aromatic group. In some embodiments, the aromatic group may be a phenyl group.

In some embodiments, the covalently bonded surfactant before covalent bonding to the polymer may include a compound represented by Formula IB, Formula IIB, or mixtures thereof:

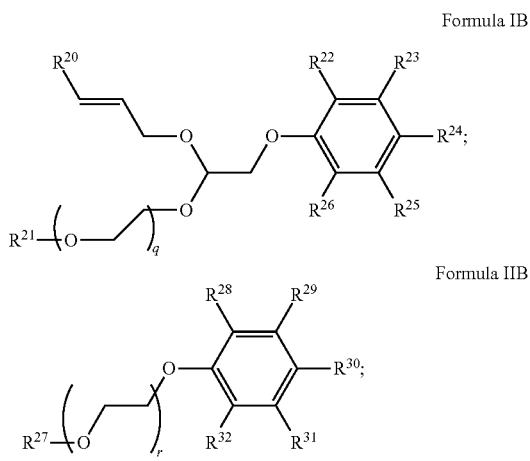

Formula IB

Formula IIB wherein: $R^{21}$ and $R^{27}$ are each independently a sulfate; $R^{20}$ is a hydrogen or methyl group; $R^{22}$, $R^{23}$, $R^{24}$, $R^{25}$, and $R^{26}$ are each independently a hydrogen or $C_1$-$C_6$ alkyl group; $R^{28}$, $R^{29}$, $R^{30}$, $R^{31}$, and $R^{32}$ are each independently a hydrogen, $C_1$-$C_6$ alkyl group, or a $C_2$-$C_6$ alkenyl group, provided that at least one of $R^{28}$, $R^{29}$, $R^{30}$, $R^{31}$, and $R^{32}$ is a $C_2$-$C_6$ alkenyl group; and q and r are each independently 5-30. In some embodiments, $R^{21}$ and $R^{27}$ each independently may be $SO_2O^-$ $X^+$, wherein $X^+$ is $Na^+$ or $NH_4^+$. In some embodiments, $R^{22}$, $R^{23}$, $R^{24}$, $R^{25}$, and $R^{26}$ may each independently be a hydrogen or branched $C_1$-$C_6$ alkyl group. In some embodiments, $R^{22}$, $R^{23}$, $R^{25}$, and $R^{26}$ are each hydrogen and $R^{24}$ is a t-butyl group. In some embodiments, $R^{28}$, $R^{29}$, $R^{30}$, $R^{31}$, and $R^{32}$ are each hydrogen or a $C_2$-$C_4$ alkenyl group. In some embodiments, q and r are each independently 5-15. In some embodiments, q and r are each independently 15-25. Other suitable surfactants that may be covalently bonded to the polymer include those disclosed in U.S. Published Patent Appl. No. 2001/0020064 and Journal of Applied Polymer Science, Vol. 109, 2275-2282 (2008) (which are herein incorporated by reference).

In some embodiments, the polymer that includes a covalently bonded surfactant has a number average molecular weight ($M_n$) of about 10,000 g/mol to about 200,000 g/mol. In some embodiments, the polymer has a number average molecular weight ($M_n$) of about 50,000 g/mol to about 150,000 g/mol. In some embodiments, the polymer has a weight average molecular weight ($M_w$) of about 50,000 g/mol to about 1,000,000 g/mol. In some embodiments, the polymer has a weight average molecular weight ($M_w$) of about 100,000 g/mol to about 500,000 g/mol.

In some embodiments, the polymeric binder is present in an amount from about 5 wt % to about 60 wt %, based on a total weight of the first composition. In some embodiments, the polymeric binder is present in an amount from about 5 wt % to about 50 wt %, about 5 wt % to about 40 wt %, about 5 wt % to about 30 wt %, or about 5 wt % to about 25 wt %, based on a total weight of the first composition.

The composition may also contain mineral fillers that can be selected from energy consuming fillers such as aluminum hydroxides, magnesium hydroxides, calcium carbonate or mixtures thereof providing additional contributions to fire retardance. Talcum, clays, silicas, silicates, carbonates and sulfates can also be used. Mixtures of the aforementioned fillers are contemplated as well.

The clay may be a clay mineral (i.e., a natural unmodified clay) such as bentonite, hectorite or montmorillonite, a synthetic clay (for example, a synthetic layered clay) such as hydrotalcite, fluormica or hectorite, an organoclay (for example, a clay mineral as herein before defined or synthetic clay modified by an organic material) or a mixture thereof. In another embodiment, the clay is a nanocomposite-forming clay (for example in a polymer dispersant).

In another embodiment, the clay is an organoclay. An organoclay present in the composition is typically a clay mineral which is physically or (preferably) chemically modified (for example, at the surface) by an organomodifier. For example, a hydrophilic clay may be modified chemically by an organomodifier to be organophilic. The organomodifier may reside on either or both of the surface and the interlayer space.

In another embodiment, the organomodifiers are alkylphosphonium or alkylammonium ions (for example, a tetraalkylammonium or tetraalkylphosphonium ion). In another embodiment, the organomodifier is an optionally hydrogenated mono- or ditallow alkylphosphonium or alkylammonium ion which may be mono- or dihydroxylated.

In another embodiment, the clay is an organomodified montmorillonite (such as hexadecyltributylphosphonium exchanged montmorillonite or decyltrimethylammonium exchanged montmorillonite). In another embodiment, the clay is a synthetic hydrotalcite LDH (available from Sud Chemie). In another embodiment, the clay is a nanoclay such as a Cloisite (available from Southern Clay Products) or organically modified Na-cloisite. In another embodiment, the organically modified Na-cloisites are Cloisite 6A, Cloisite 25A, Cloisite 30B, Cloisite 15A, Cloisite 10A, Cloisite 30B, Cloisite 15A, Cloisite 10A, or Cloisite 10A. In another embodiment, the clay is a mixture of Na-Cloisite and one or more of the group consisting of Cloisite 30B, Cloisite 15A and Cloisite 10A.

An effective amount of clay present in the composition is from 0.0 to 6.0 wt %. In another embodiment, the effective amount of clay present in the composition is from about 0.2 to about 5.0 wt %. In another embodiment, the effective amount of clay present in the composition is from about 0.25 to about 2 wt %. In another embodiment, the effective amount of clay present in the composition is from about 0.75 to about 1.5 wt %. In another embodiment, the effective amount of clay present in the composition is from about 0.5 to about 1.25 wt %.

The coating composition may further comprise an inorganic char strengthening agent. The inorganic char strengthening agent may be selected from the group consisting of mineral wool fibers, glass flakes, an aluminosilicate (for example, a potassium sodium alumina silicate such as nepheline syenite) or a ceramic material (for example, a ceramic pigment).

The inorganic char strengthening agent is present in an amount from about 0 to about 9 wt %. In another embodiment, the inorganic char strengthening agent is present in an amount from about 0.5 to about 9 wt %. In another embodiment, the inorganic char strengthening agent is present in an amount from about 1 to about 9 wt %. In another embodiment, the inorganic char strengthening agent is present in an amount from about 2 to about 8 wt %.

In another embodiment, the composition may further include flame retardants selected from the group consisting of minerals, organophosphorus compounds, and the reaction product of 2,4-bis[(1-cyclohexyloxy-2,2,6,6-piperidin-4-yl)butylamino]-6-chloro-s-triazine with N,N'-bis(3-aminopropyl)ethylenediamine).

In another embodiment, the composition may include additional flame retardant minerals selected from the group consisting of aluminum hydroxide, magnesium hydroxide, huntite and hydromagnesite, various hydrates, red phosphorus, boron compounds, and borates.

In another embodiment, the composition includes additional flame retardant organophosphorus compounds selected from the group consisting of triphenyl phosphate, resorcinol bis(diphenylphosphate), bisphenol A diphenyl phosphate, tricresyl phosphate, dimethyl methylphosphonate, aluminium diethyl phosphinate, tris(2,3-dibromopropyl) phosphate (brominated tris), tris(1,3-dichloro-2-propyl) phosphate, and tetrakis(2 chlorethyl) dichloroisopentyldiphosphate.

The additional flame retardant is present in an amount from about 0 to 9 wt %. In another embodiment, the additional flame retardant is present in an amount from about 0.5 to 9 wt %. In another embodiment, the additional flame retardant is present in an amount from about 1 to 9 wt %. In another embodiment, the additional flame retardant is present in an amount from about 2 to 8 wt %.

In certain aspects, the composition may further include fibrous materials suitable for reinforcement. Such fibrous materials may include organic, glass, or mineral. The fibrous material may be present in the composition in any suitable amount. In certain aspects, the composition may include from about 0.5 to 10 wt % or about 1 to 8 wt % of the fibrous material, based on a total solid weight of the composition. The fibrous material may be present in the composition measuring any suitable length. In certain aspects, the fibrous material has a length of up to 1000 microns.

The compositions contain an additive or combination of additives. Suitable additives will be well known to the person skilled in the art. Examples of suitable additives include, but are not limited to the following: plasticizers; pigments; defoamers; thixotropic agents; biocides; fragrances; fillers; adhesion agents; intumescent and fire-stop agents; buffers; dispersing agents; surfactants; deaerators; surface control additives; hydrophobing agents; wetting additives; rheological agents; anti-cratering additives; radiation curing additives; anti-corrosion additives; pH regulators; anti-graffiti additives or combinations thereof.

Suitable rheology modifiers (rheological agents) will be well known to the person skilled in the art. Suitable examples of rheology modifiers include, but are not limited to the following: fumed silica; bentonite clay; castor oils and derivatives thereof; micronized amide wax or combinations thereof. In certain aspects the rheology modifier, when present, may be used in the composition in amounts of at least 0.01 wt % based on a total solid weight of the composition.

The compositions may be clear coatings or colored paint coatings with pigment(s) (e.g., titanium dioxide). Paints including the compositions may include other typical paint additives such as dispersants, pigments, extenders and fillers, rheology modifiers, solvents, and/or wetting agents. Suitable pigments will be well known to the person skilled in the art. Suitable pigments may be, for example, titanium dioxide and/or carbon black. The pigment, when present, may be used in the composition in any suitable amount. In certain aspects, the pigment, when present, may be used in the composition in amounts of up to about 40 wt %, such as up to about 30 wt %, or even up to about 15 wt % based on a total solid weight of the composition. In some aspects, the pigment may be present in an amount of between 3 to 20 wt %, such as 5 to 15 wt %. Plasticizers may optionally be added to the composition in order to increase flexibility. Suitable plasticizers will be well known to the person skilled in the art. Suitable plasticizers include, but are not limited to the following: aromatic alcohols such as benzyl alcohol and nonyl phenol; phosphate esters such as isopropylated triaryl phosphate ester or combinations thereof. The plasticizer, when present, may be present in amounts from about 1 to 10 wt % based on a total solid weight of the composition. Suitably, the composition may comprise a pigment volume concentration of between 30 to 80 wt %, such as between 40 to 70 wt %, for example 45 to 70 wt %. The "pigment volume concentration" refers to the volume of solid content in the total composition.

The compositions commonly include water. In some embodiments, the compositions may include an organic solvent. Organic solvents include, but are not limited to, glycol ethers such as an alkylene glycol alkyl ether (e.g., ethylene glycol monobutyl ether). The compositions typically have a relatively low viscosity to aid ease of application, requiring no line heater during application at ambient temperature. In some embodiments, the water may be present from about 5 wt % to about 60 wt %, based on a total weight of the composition. In some embodiments, the water may be present from about 8 wt % to about 50 wt % or about 10 wt % to about 40 wt %, based on a total weight of the composition. In some embodiments, the composition has a viscosity of between 20,000 and 140,000 mPa/s at 20° C. and shear rate 1.5 s. In some embodiments, the composition may have a viscosity from about 25,000 to 125,000 mPa/s at 20° C. and shear rate 1.5 s, suitably from about 30,000 to 110,000 mPa/s, such as from about 35,000 to 95,000 mPa/s. In some embodiments, the composition may have a viscosity from about 40,000 to 95,000 mPa/s at 20° C. and shear rate 1.5 s. Methods to measure viscosity will be well known to a person skilled in the art. Suitably, the viscosity is measured using Brookfield RV spindle s7 at 6 rpm and shear rate 1.5 s, according to ASTM D2196-10 ("Standard Test Methods for Rheological Properties of Non-Newtonian Materials by Rotational (Brookfield type) Viscometer". In some embodiments, when the coating is spray applied the viscosity may be reduced by the addition of water (depending on the application parameters of the spray equipment).

In some embodiments, the compositions that include an intumescent agent may intumesces at a temperature of 300° C. or less, suitably 250° C. or less, or even 200° C. or less. In some embodiments, the composition swells at least 10 times (1000%) or at least 20 times (2000%) of its original thickness in less than 20 minutes when heated according to the EN 1363-1 (ISO 834) fire test. The temperature in the furnace after 10 minutes of this test is approximately 678° C. and after 30 minutes it is approximately 842° C.

The present technology provides a process for forming a coating, the process including: applying the first composition as described herein to the surface of the substrate; applying the second composition as described herein to the surface of the substrate; and allowing the first composition and the second composition to crosslink to form the coating within 30 seconds; wherein the coating is non-sagging, water-resistant, and dry-to-the touch.

The present technology also provides a process for forming a coating, the process including: co-applying the first composition and the second composition as described herein to the surface of the substrate; and allowing the first composition and the second composition to crosslink to form the coating with 30 seconds; wherein the coating is non-sagging, water-resistant, and dry-to-the touch. In some embodiments, the co-applying includes simultaneously co-spraying the first composition and the second composition to the surface of the substrate.

In some embodiments, the surface of the substrate is a vertical surface. The composition may be applied to any suitable substrate. Examples of suitable substrates include but are not limited to steel, aluminum, wood, and/or concrete; construction units such as drywall; beams; hollow beams; cellular beams; columns and hollow columns. In some embodiments, the substrate is steel, aluminum, and/or concrete. In some embodiments, the substrate is steel. Various steel substrates can include cold rolled, hot rolled, cold drawn (cold finished), etc. In some embodiments, the substrate is aluminum. In some embodiments, the substrate is wood and/or drywall. Substrates for insulative and/or vibration dampening coatings may further include plastics.

The present technology provides a 2-pack coating kit that includes a first pack containing the first composition described herein, and a second pack containing the second composition described herein.

The present technology also provides a method of producing a composition as described herein, the method includes: forming the polymeric binder; forming the first composition; and forming the second composition.

The polymeric binders disclosed herein may be formed using methods known to persons of ordinary skill in the art including methods disclosed in U.S. Pat. No. 7,887,626, RE 44,931, PCT/US2017/057214, U.S. Published Patent Appl. No. 2001/0020064, and Journal of Applied Polymer Science, Vol. 109, 2275-2282 (2008) (each of which is herein incorporated by reference).

The present technology, thus generally described, will be understood more readily by reference to the following examples, which are provided by way of illustration and are not intended to be limiting of the present technology.

EXAMPLES

The composition of various tradename components used below are as follows:

Dispex® PX 4585 is a water-based dispersant of the acrylic block copolymer made by Controlled Free Radical Polymerization (CFRP), available from BASF;
Ti-Pure™ R-900 is a rutile titanium dioxide pigment, available from Chemours Company;
Foamstar® ST 2438 is a 100% active defoamer compound combining a hyper-branched star polymer with high-end organo-silicones, available from BASF;
Aerosil® 200 is a hydrophilic fumed silica with a specific surface area of 200 $m^2/g$, available from Evonik Corporation;
Melamine is available from Sigma-Aldrich Company;
Exolit® APP 422 is a product based on ammonium polyphosphate. The crystal modification is phase II, available from Clariant;
Acronal® 4750 is an all acrylic resin dispersion, 50 wt % solids, VOC=<0.2, Brookfiled viscosity=<500 cps, available from BASF;
Melapur® 200 is melamine polyphosphate which is a salt of melamine and polyphosphoric acid, available from BASF;
Melapur® MP is melamine phosphate which is a salt of melamine and phosphoric acid, available from BASF;
Rheovis 1235 is a non-ionic associative HEUR thickener, available from BASF; Charmor® PM40 is a micronized pentaerythritol derivative, available from Perstorp;
Butyl Cellosolve™ is 2-butoxyethanol available from The Dow Chemical Company;
Foamstar® ST 2446 is a defoamer compound combining a hyper-branched star polymer technology with high-end organo-silicones, available from BASF;
Glass Bubbles K37 are lightweight hollow glass microspheres with a density of 0.37 g/cc and a crush strength of 3,000 psi, available from 3M; and
Glass Bubbles XLD3000 are hollow glass spheres with a typical density of 0.23 g/cc and an isostatic crush strength of 3,000 psi, available from 3M.

For the purposes of PVC calculation for the intumescent compositions, melamine was used in the resin side of the equation.

Example 1. Polymeric Binder Synthesis-polymer including covalently bonded surfactant. In a one liter resin kettle equipped with an agitator, nitrogen inlet, thermometer and addition ports, water (154 grams), 1-poly(oxyethylene)$_{20}$-2-vinyl-4-nonylphenyl ether ammonium sulfate (Montello, 1.98 grams, 20 wt % active in water) and sodium cetyl stearyl sulfate (0.6 grams, Aldrich Chemical Company) were added. The solution was deaerated using argon for 10 minutes. With agitation, the solution was heated to 85° C. In a separate reactor, water (66 grams), sodium cetyl stearyl sulfate (2.4 grams), styrene (27.8 grams, Aldrich Chemical Company), methylmethacrylate (70.2 grams, Aldrich Chemical Company), 1-poly(oxyethylene)$_{20}$-2-vinyl-4-nonylphenyl ether ammonium sulfate (Montello, 9.69 grams, 20 wt % active in water), butyl acrylate (72 grams, Aldrich Chemical Company), methacrylic acid (5.4 grams, Aldrich Chemical Company), hydroxyethylmethacrylate (4.5 grams, Aldrich Chemical Company), and isooctyl 3-mercaptopropionate (0.09 grams, Aldrich Chemical Company) were combined with agitation so that the mixture produced a stable emulsion. The emulsion and initiator feed (ammonium persulfate, 0.39 grams of a 20 wt % aqueous solution) were added simultaneously over 2 hours to the resin kettle solution with good agitation while maintaining 85° C. Ammonia or another base may be added during the feed or at the completion of the feed to maintain a pH of 7.5-8.5. After the feed was completed, isoascorbic acid and tertiary butyl hydroperoxide dissolved in water were fed to the reactor over approximately 20 minutes. After a short hold period, the reactor was cooled having a pH=9, viscosity 150-950 cps (Brookfield #2LV, 30 rpm, 60 seconds), 45 wt % resin solids. The resulting polymer had the following properties: $M_n$=72,350; $M_w$=340,988, $M_z$=988,068, as determined by gel permeation chromatography; $T_g$=37.0 C as determined by differential scanning calorimetry, and having a reactive surface covalently attached thereto.

Example 2. Polymeric Binder Synthesis—hyperbranched polymer. To a three-neck round bottom flask a latex (400 g) prepared from 20% styrene, 35% 2-ethylhexyl acrylate, 33.3% butyl methacrylate, 1.67% isooctyl mercaptopropionate, and 10% methacrylic acid was charged. The latex was neutralized using 14% $NH_4OH$ solution (4.34 g, Aldrich Chemical Company). The neutralized latex was then heated to 85° C. and a di-epoxide (diglycidyl ether of cyclohexane dimethanol, 5.45 g, Aldrich Chemical Company) was added over 30 minutes. After the di-epoxide addition, the solution was held at 85° C. for 30 minutes, followed by the addition over 30 minutes of a monofunctional epoxide (alkyl $C_{12}$-$C_{14}$ glycidyl ether, 11.48 g, Aldrich Chemical Company). The temperature was then raised to 87° C. and held for 150 minutes to produce a modified latex with a hyperbranched polymer structure. The modified latex was then cooled and filtered to yield a material having 39.5% solids, a pH of 7.95, and a viscosity of 6 cps as measured at 50 rpm with a #2 spindle using a Brookfield viscometer. The resulting hyperbranched polymer had the following properties: $M_n$=31,966; $M_w$=337,943, $M_z$=1,018,561, as determined by gel permeation chromatography; and $T_g$=36.8 C as determined by differential scanning calorimetry.

Example 3. Polymeric Binder Synthesis—hyperbranched polymer. A random copolymer was synthesized from the following monomers: acrylic acid (100 grams, Aldrich Chemical Company), butyl acrylate (140 grams, Aldrich Chemical Company), methyl methacrylate (490 grams, Aldrich Chemical Company), styrene (270 grams, Aldrich Chemical Company) according to the high temperature, continuous polymerization processes as described in U.S. Pat. Nos. 546,160; 4,414,370; and 4,529,787; giving a solid polymer with about 99 wt % solids. The resulting polymer had the following properties: $M_n$=5,126; $M_w$=15,853 (measured by GPC using polystyrene standards for calibration); $T_g$ 75° C. (measured by DSC—midpoint value; ramp 10° C./min), theoretical acid number (mg KOH/g)=78, theoretical hydroxyl number (mg KOH/g)=0.

An aqueous dispersion of the polymer was prepared as follows: polymer as described above (653.71 g), water (733.9 g), methyldiethanolamine (22.77 g, Aldrich Chemical Company), and diethanolamine (10.13 g, Aldrich Chemical Company) were added to a reaction vessel. The mixture was heated to 88-92° C. and kept under agitation until all the polymer was dispersed in water (about 3-4 hours). To the polymer dispersion was added bisphenol F diglycidyl ether (29.22 g, Aldrich Chemical Company) and the mixture was held for 2 hours at 88-92 C. $C_{12}$-$C_{14}$ monoglycidyl ether (33.8 g, Aldrich Chemical Company) was then added and the temperature maintained for an additional 3 hours. Upon reaction with glycidyl ether compounds, more base can be added to adjust pH, hydroxyl number, etc. The resulting polymer had the following properties: $M_n$=188,591; $M_w$=341,273, $M_z$=998,195, as determined by gel permeation chromatography; $T_g$=36.7 C as determined by differential scanning calorimetry, 43-45 wt % solids, pH=7.8-8.3, hydroxyl number (mg KOH/g)=70.

Comparative Example 1: Intumescent Composition and Coating thereof. In a high-speed disperser with a 2:1 blade, water (71 grams) was added and the agitation was set at 2000 rpm. The following were added in the order listed, Dispex 4585 (5 grams), Ti-Pure R-900 (30 grams), FoamStar 2438 (1.5 grams), Aerosil 200 (5 grams), melamine (37.5 grams), Exolit APP 422 (110 grams), Charmor PM40 (45 grams) and agitation was continued for 15 minutes. The agitation rate was decreased to 1500 rpm while Acronal 4750 (45% solids, 156 grams) and Rheovis PU 1235 (5 grams dissolved in 10 grams of Butyl Cellosolve) were added over 2-3 minutes. Water (40 grams) and Butyl Cellosolve (10 grams) were added and agitation was continued for 5 minutes. The percent solids was 58.8% with a PVC of about 50%. This high PVC formula using low Tg resin (15 C) was coated onto cold rolled steel (CRS) panels using drawdown bars with different wet film thicknesses (WFT, 50-250 mils) and cured at 22° C. for 7 days. Some cracking was observed in the cured coatings. The panels were tested for intumescent properties using a muffle furnace (1000 F for 10 min). There was a slight char thickness increase with increased coating thickness, however, the increase in charring thickness was not significant.

| WFT (mils) | DFT (mils) | Increase in Charring Thickness (cm) |
|---|---|---|
| 50 | 27 | 0.1 |
| 100 | 45 | 0.15 |
| 150 | 58 | 0.2 |
| 200 | 77 | 0.4 |
| 250 | 83 | 0.6 |

Example 4. Intumescent Composition and Coating thereof—Example 1 Polymer. In a high-speed disperser with a 2:1 blade, water (71 grams) was added and the agitation was set at 2000 rpm. The following were added in the order listed, Rheovis 1235 (5 grams), Ti-Pure R-900 (30 grams), FoamStar 2438 (1.5 grams), Aerosil 200 (5 grams), melamine (37.5 grams), Exolit APP 422 (110 grams), Charmor PM40 (45 grams) and agitation was continued for 15 minutes. The agitation rate was decreased to 1500 rpm while Example 1 (45% solids, 156 grams) and Rheovis P U 1235 (5 grams dissolved in 10 grams of Butyl Cellosolve) were added over 2-3 minutes. Water (40 grams) and Butyl Cellosolve (10 grams) were added and agitation was continued for 5 minutes. The percent solids was 58.8% with a PVC of about 50%. Using a Brookfield viscometer, a viscosity of 4115 cP was measured using spindle #3 and 20 rpm at 22 C. This high PVC formula without the coagulant was coated using drawdown bar onto cold rolled steel (CRS) panels with different wet film thicknesses (WFT, 50-250 mils) and cured at 22° C. for 7 days. Some cracking was observed in the cured coatings after seven days. The panels were tested for intumescent properties using a muffle furnace (1000° F. for 10 min). There was increase in char thickness with increasing coating thickness and an increase in charring thickness compared to the Comparative Example 1.

| WFT (mils) | DFT (mils) | Increase in Charring Thickness (cm) |
|---|---|---|
| 50 | 17 | 0.8 |
| 100 | 33 | 1.2 |
| 150 | 40 | 1.7 |
| 200 | 56 | 2.2 |
| 250 | 80 | 4.7 |

Example 5. Intumescent Composition and Coating thereof—Example 1 Polymer. In a high-speed disperser with a 2:1 blade, water (71 grams) was added and the agitation was set at 2000 rpm. The following were added in the order listed, Dispex 4585 (5.5 grams), Ti-Pure R-900 (30 grams), FoamStar 2438 (1.7 grams), Aerosil 200 (5 grams), melamine (37.5 grams), Exolit APP 422 (110 grams), Charmor PM40 (45 grams) and agitation was continued for 15 minutes. The agitation rate was decreased to 1500 rpm while Example 1 (45% solids, 156 grams) was added over 2-3 minutes. Water (40 grams) and Butyl Cellosolve (21 grams) were added and agitation continued for 5 minutes. The percent solids was 58.3% with a PVC of about 50%. Using a Brookfield viscometer, a viscosity of 85 cP was measured using spindle #3 and 20 rpm at 22 C. This high PVC formula with the coagulant (aqueous 3 wt % aluminum sulfate solution, 30 g) mixed in during the spraying application was sprayed onto cold rolled steel (CRS) panels with different wet film thicknesses (WFT, 50 mils). The coating was dry to touch without paint or coating transfer in less than 30 seconds.

Example 6. Intumescent Composition and Coating thereof—Example 3 Polymer. In a high-speed disperser with a 2:1 blade, water (71 grams) was added and the agitation was set at 2000 rpm. The following were added in the order listed, Dispex 4585 (5 grams), Ti-Pure R-900 (30 grams), FoamStar 2438 (1.5 grams), Aerosil 200 (5 grams), melamine (37.5 grams), Exolit APP 422 (110 grams), Charmor PM40 (45 grams) and agitation was continued for 15 minutes. The agitation rate was decreased to 1500 rpm while Example 3 (45% solids, 156 grams) and Rheovis PU 1235 (5 grams dissolved in 10 grams of Butyl Cellosolve) are added over 2-3 minutes. Water (40 grams) and Butyl Cellosolve (10 grams) are now added and agitation is continued for 5 minutes. The percent solids was 58.7% with a PVC of about 50%. Viscosity was approximately 4000-5000 cP. This high PVC formula without the coagulant was coated using drawdown bar onto cold rolled steel (CRS) panels with different wet film thicknesses (DFT, 50 and 100 mils), cured for 7 days at room temperature, dry to touch in 24 hours. The panels were tested for intumescent properties using a muffle furnace (1000° F. for 10 min). There was an increase in char thickness with increasing coating thickness and an increase in charring thickness compared to the Comparative Example 1.

Example 7. Intumescent Composition and Coating thereof—Example 1 Polymer. In a high-speed disperser with a 2:1 blade, water (71 grams) was added and the agitation was set at 2000 rpm. The following were added in the order listed, Dispex 4585 (5 grams), Ti-Pure R-900 (30 grams), FoamStar 2438 (1.5 grams), Aerosil 200 (5 grams), melamine (27.3 grams), Melapur 200 (53 grams), Exolit APP 422 (80.5 grams), Charmor PM40 (33 grams) and agitation was continued for 15 minutes. The agitation rate was decreased to 1500 rpm while Example 1 (45% solids, 156 grams) and Rheovis P U 1235 (5 grams dissolved in 10 grams of Butyl Cellosolve) were added over 2-3 minutes. Water (40 grams) and Butyl Cellosolve (10 grams) were added and agitation was continued for 5 minutes. The percent solids was 58.3% with a PVC of about 50%. Viscosity was approximately 4000-5000 cP as measured with Brookfield DVII Viscometer using spindle #3 and 20 rpm at 22 C. This high PVC formula without the coagulant was sprayed onto cold rolled steel (CRS) panels with different wet film thicknesses (DFT 50 and 100 mils), cured for 7 days at RT, dry to touch in 24 hours. The panels were tested for intumescent properties using a muffle furnace (1000° F. for 10 min). There was an increase in char thickness with increasing coating thickness and an increase in charring thickness compared to the Comparative Example 1.

Example 8. Intumescent Composition and Coating thereof—Example 1 Polymer. In a high-speed disperser with a 2:1 blade, water (71 grams) was added and the agitation was set at 2000 rpm. The following were added in the order listed, Dispex 4585 (5 grams), Ti-Pure R-900 (30 grams), FoamStar 2438 (1.5 grams), Aerosil 200 (5 grams), melamine (27.3 grams), Melapur 200 (26.5 grams), Melapur M P (26.5 grams), Exolit APP 422 (80.5 grams), Charmor PM40 (33 grams) and agitation was continued for 15 minutes. The agitation rate was decreased to 1500 rpm while Example 1 (45% solids, 156 grams) and Rheovis PU 1235 (5 grams dissolved in 10 grams of Butyl Cellosolve) were added over 2-3 minutes. Water (40 grams) and Butyl Cellosolve (10 grams) were added and agitation was continued for 5 minutes. The percent solids was 58.8% with a PVC of about 50. Viscosity was approximately 5000 cP as measured with Brookfield DVII Viscometer using spindle #3 and 20 rpm at 22 C.

Example 9. Intumescent Composition and Coating thereof—Example 1 Polymer. In a high-speed disperser with a 2:1 blade, water (71 grams) was added and the agitation was set at 2000 rpm. The following were added in the order listed, Dispex 4585 (5 grams), Ti-Pure R-900 (30 grams), FoamStar 2438 (1.5 grams), Aerosil 200 (5 grams), melamine (27.3 grams), Melapur MP (53 grams), Exolit APP 422 (80.5 grams), Charmor PM40 (33 grams) and agitation was continued for 15 minutes. The agitation rate was decreased to 1500 rpm while Example 1 (45% solids, 156 grams) and Rheovis PU 1235 (5 grams dissolved in 10 grams of Butyl Cellosolve) were added over 2-3 minutes. Water (40 grams) and Butyl Cellosolve (10 grams) were added and agitation was continued for 5 minutes. The percent solids was 58.8% with a PVC of about 50%. Viscosity was approximately 5000 cP as measured with Brookfield DVII Viscometer using spindle #3 and 20 rpm at 22° C.

Example 10. Insulative Composition and Coating thereof—Example 1 Polymer. In a high-speed disperser with a 2:1 blade, water (8.4 grams) was added and the agitation was set at 2000 rpm. The following were added in the order listed, Dispex 4585 (8.5 grams), FoamStar S T 2446 (1.0 gram), and K37 glass spheres (32.8 grams). Agitation was continued for 15 minutes. The agitation rate was decreased to 1500 rpm while Resin Example 1 (45% solids, 45.6 grams) was added over 2-3 minutes. Ethylene glycol monobutyl ether (Eastman E B, 5.7 grams) was added and agitation was continued for 5 minutes. The percent solids was 55.6% with a PVC of 79.7%.

Example 11. Insulative Composition and Coating thereof—Example 1 Polymer. In a high-speed disperser with a 2:1 blade, water (8.4 grams) was added and the agitation was set at 2000 rpm. The following were added in the order listed, FoamStar ST 2446 (1.0 gram) and K37 glass spheres (32.8 grams). Agitation was continued for 15 minutes. The agitation rate was decreased to 1500 rpm while Resin Example 1 (45% solids, 45.6 grams, were added over 2-3 minutes). Ethylene glycol monobutyl ether (Eastman EB, 5.7 grams) was added and agitation was continued for 5 minutes. The percent solids was 55.6% with a PVC of 78.9%.

Example 12. Insulative Composition and Coating thereof—Example 1 Polymer. In a high-speed disperser with a 2:1 blade, water (400 grams) was added and the agitation was set at 2000 rpm. The following were added in the order listed, K37 glass spheres (75 grams) and XLD 3000 glass spheres (75 grams). Agitation was continued for 15 minutes. The agitation rate was decreased to 1500 rpm while Resin Example 1 (45% solids, 150 grams) were added over 2-3 minutes. Ethylene glycol monobutyl ether (Eastman EB, 18 grams) was added and agitation was continued for 5 minutes. The percent solids was 29.8% with a PVC of 89.8%.

The resulting composition was spray coated on three polycarbonate plaques (Marklon, Bayer). After 30 seconds the coated panels had no material transfer when touched. After 4 hours at ambient temperature the panels had through cured with a DFT of 2-3 millimeters. The panels slightly differed as follows:

Panel 1: as is with some stippling;
Panel 2: after light sanding to smooth the surface;

Panel 3: Panel 2 placed in an environmental chamber at 100° F. 80% relative humidity for 18 hours; water pickup was negligible.

Using the procedure described above, two comparative example panels were also prepared from:

Comparative Example 2: Heat-Flex 3500® Thermal Insulative Coating is a multi-purpose insulative waterborne acrylic coating engineered to optimize thermal properties, offering personnel burn protection and process insulation, available from Sherwin Williams.

Comparative Example 3: Mascoat® Industrial-DTI is a composite ceramic & silica-based waterborne acrylic insulating coating that provides an insulating barrier, protects personnel and blocks corrosion all in one application, available from Mascoat.

The thermal conductivity of all panels prepared above was measured according to ASTM C-518. The results are provided in Table 1.

TABLE 1

Thermal Conductivity

| Example | Thermal Conductivity (N/mK) |
|---|---|
| Comparative 2 | 0.097 |
| Comparative 3 | 0.0698 |
| Panel 1 | 0.057 |
| Panel 2 | 0.054 |
| Panel 3 | 0.055 |

The results illustrate that the instant insulative compositions can provide coatings with better insulative properties as judged by lower thermal conductivity measurements than commercial insulative compositions.

Examples 10-12 were spray applied on panels. All of the spray applied coated panels showed no cracking, no shrinkage from panel edge, and no delamination after the post spray exposures after 72 hours at ambient temperature.

Example 13: Polymeric Resin Synthesized Via Continuous High Temperature Polymerization Process (Sound Deadening Material). The sound deadening material suitable for use in the present technology may be prepared via addition polymerization in homogenous or heterogeneous media. Table 2 summarizes the acrylic polymer polymerized product according to the present technology and prepared via a continuous free radical polymerization process at relatively high temperature. The polymerization takes place in a homogenous environment. High reaction temperatures allow achieving low molecular weights without the use of chain transfer agents. After the polymerization step, the resin is subjected to a devolatilizer to remove unreacted monomers and process solvents.

TABLE 2

Polymeric Resin Synthesized Via Continuous Polymerization Process

| Polymer | Polymer composition (wt %) | Tg (° C.) | Mn (k Da) | Mw (k Da) | PDI |
|---|---|---|---|---|---|
| Example 13 | 50 MMA/30 Sty/ 10 AA/10 DAAM | 85 | 3.3 | 8.1 | 2.6 |

MMA = methyl methacrylate;
Sty = styrene;
AA-acrylic acid;
DAAM = diacetone acrylamide;
wt = weight The acid functional polymer described above is dispersed in water by neutralizing a fraction of the acid groups with a base under agitation and heat. As described in Table 3, the dispersion of Example 13 at 43 weight % solids was prepared by adding the polymer of Example 13 (518.6 grams), deionized water (668 grams), and ammonia (13.4 grams, 29 wt % active) to a reaction vessel equipped with a condenser and an overhead stirrer. This mixture was heated to 88-92° C. under agitation and kept for 4 hours. The reaction mixture was cooled to 50-55° C. at which time 0.75 equivalents of adipic acid dihydrazide (relative to ketone groups from DAAM present in the resin) was added to promote self-crosslinking during cure; after which, the reaction mixture was cooled down to room temperature and filtered.

TABLE 3

Aqueous Resin Dispersion made from Polymeric Resin Synthesized Via Continuous Polymerization Process

| Dispersion | Resin Composition | Solids | pH | Visc. (mPa · sec) | $NH_4OH$ mmol/g | d (nm) |
|---|---|---|---|---|---|---|
| Example 13 Dispersion | Example 13 | 43.3 | 7.04 | 140 | 0.213 | 57 |

Visc. = viscosity, d = diameter

Example 14. Intumescent Composition and Coating thereof—Example 13 Polymer. In a high-speed disperser with a 2:1 blade, water (71 grams) was added and the agitation was set at 2000 rpm. The following were added in the order listed, Dispex 4585 (5 grams), Ti-Pure R-900 (30 grams), FoamStar 2438 (1.5 grams), Aerosil 200 (5 grams), melamine (35 grams), Exolit APP 422 (124 grams), Charmor PM40 (35 grams) and agitation was continued for 15 minutes. The agitation rate was decreased to 1500 rpm while Example 13 Dispersion (159 grams) and Rheovis PU 1235 (5 grams dissolved in 10 grams of Butyl Cellosolve) are added over 2-3 minutes. Water (40 grams), Butyl Carbitol (10 grams) and Butyl Cellosolve (27.65 grams) are now added and agitation is continued for 5 minutes. The percent solids were 57.4 percent. This formula was spray applied to cold rolled steel (CRS) panels having a fully cured epoxy primer using a 2K pleural component spray gun system using an approximate ratio of the formulation described above to catalyst ratio of 10:1 based on weight. The catalyst was a 15 weight percent aqueous solution of aluminum sulfate.

Comparative Examples 4A and 4B: Avicor 2456 is a vinyl acetate/versatic acid/acrylic self crosslinking terpolymer emulsion with the following properties: solids=50 wt %, Tg=19° C., minimum film forming temperature=11° C. and a particle size of 175 nm, which is available from Celanese. Following the procedure of Example 14, an aqueous intumescent formulation was prepared. This formulation could not be sprayed at wet film thicknesses greater than 10 mils due to very slow cure and extreme sagging. To get a wet film thickness of greater than 10 mil, the cold rolled steel (CRS) panels having a fully cured epoxy primer were laid on the lab bench surface and the coating formulation was applied via a pipette to the desired thickness. The wet coating films were cured at 23° C. and 50 percent relative humidity for about 72 hours. The panels were tested for intumescent properties using a muffle furnace (1000° F. for 10 min). The increase in char relative to the un-charred panel was measured by average expansion factor.

TABLE 4

Intumescent Data for Comparative Resin With (4A) and Without (4B) Catalyst

| Example | Catalyst | Average WFT (mils) Coat | Average DFT (mils) Coat | Average Expansion Factor |
|---|---|---|---|---|
| Comparative Ex 4A | none | about 128 | 64 | 12.64 |
| Comparative Ex 4B | present | about 146 | 73 | 13.34 |

A wet film thickness of up to 150 mil was obtained by continuously spraying the coating formulations of Example 14 and Comparative Examples 4A and 4B. The wet coating films were cured at 23° C. and 50 percent relative humidity for about 72 hours. The panels were tested for intumescent properties using a muffle furnace (1000° F. for 10 min). The increase in char relative to the un-charred panel was measured by average expansion factor which is calculated by the film char height in inches or mils divided by the uncharred dry film thickness in inches (Table 5).

These results clearly demonstrate that the instant intumescent formulations give an increased char height (in terms of average expansion factor) at lower film thickness. This char is what will protect the substrate during a fire or other high temperature event and a greater char height will provide improved fire protection.

These results further demonstrate that the catalyst had little effect on average expansion factor on this comparative resin.

TABLE 5

Comparative Intumescent Data for Instant Resin

| Example | Catalyst | Average WFT (mils) Coat | Average DFT (mils) Coat | Average Expansion Factor |
|---|---|---|---|---|
| Comparative Ex 4 | None | about 66 | 33 | 12.09 |
| Example 14 | Present | about 40 | 20 | 13.66 |
| Example 14 | Present | about 34 | 17 | 20.58 |

WFT = wet film thickness;
DFT = dry film thickness

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:
1. A coating composition comprising:
  a first composition comprising a polymeric binder; and
  a second composition comprising a coagulating agent,
    wherein the coagulating agent comprises calcium pantothenate, glycine calcium salt, alanine calcium salt, serine calcium salt, threonine calcium salt, methionine calcium salt, phenylalanine calcium salt, calcium aspartate, sodium oxalate, magnesium acetate, calcium pantothenate, glycine calcium salt, alanine calcium salt, serine calcium salt, threonine calcium salt, methionine calcium salt, phenylalanine calcium salt, calcium aspartate, polyphosphoric acid, or a combination of any two or more thereof;
  a sound deadening agent comprising an acrylic polymer polymerization product of a molten resin mixture comprising:
    at least one acrylic monomer;

a polymerization initiator present in a molar ratio of the polymerization initiator to the at least one acrylic monomer from about 0.0005:1 to about 0.06:1; and from 0 wt % to about 25 wt % of a reaction solvent based on the weight of acrylic monomers, wherein the acrylic polymer polymerization product comprises unreacted acrylic monomers and the acrylic polymer product;

wherein:

the first composition and the second composition form a coating within 30 seconds of application when applied to a substrate, and the coating is non-sagging according to ASTM 04400, water-resistant according to ASTM E96, and dry-to-the touch according to ASTMD1640.

2. The composition of claim 1 further comprising an additive, wherein the additive is present in the first composition, the second composition, or both the first and second compositions.

3. The composition of claim 2, wherein the additive comprises an intumescent agent, a vibration damping agent, an insulation agent, or a combination of two or more thereof.

4. The composition of claim 3, wherein the intumescent agent comprises an acid source, a carbon source, and a gas forming agent, the vibration damping agent comprises a first filler, and the insulation agent comprises a second filler.

5. The composition of claim 4, wherein
the acid source comprises melamine phosphate, magnesium phosphate, boric acid and ammonium poly-phosphate, polyphosphoric acid, or a combination of any two or more thereof;
the carbon source comprises a $C_4$-$C_{20}$ alcohol, a polyol compound, a polyhydroxylated $C_4$-$C_{20}$ alkyl, or a combination of any two or more thereof;
the gas forming agent comprises melamine, melamine cyanurate, melamine borate, melamine phosphate, tris-(hydroxyethyl) isocyanurate, melamine polyphosphate, chlorinated paraffin, or a combination of any two or more thereof;
first filler comprises a mineral filler, polymeric plastic filler, or a combination thereof; and
the second filler comprises balsa wood, calcium silicate, cellulose, chalk, cork board, cork regranulated, cotton, cotton wool, diatomaceous earth, felt insulation, fiberglass, foam glass, glass wool, hairfelt, kapok insulation, magnesia insulation, mineral wool insulation, paper, peat, foamed plastics, polypropylene, polyethylene, polyurethane, rock wool, sheep wool, silica aerogel, slag wool, polystyrene, vermiculite, wax, perlite, rice hulls, hollow glass spheres, hollow ceramic spheres, alumina-silica fibers, alumina-silica-zirconia fibers, polycrystalline mullite fibers, calcium-alumino-silicate fibers, alumina fibers, mineral fibers, or a combination of two or more thereof.

6. The composition of claim 1, wherein the at least one acrylic monomer comprises at least one latent crosslinking monomer.

7. The composition of claim 1, wherein the acrylic polymer polymerization product is prepared via a continuous bulk polymerization process comprising:
charging into a continuous mixed reactor zone comprising the molten resin mixture;
maintaining a flow rate through the reaction zone; and
maintaining the molten resin mixture at an elevated temperature from about 180° ° C. to about 270° C.

8. The composition of claim 1, wherein the coagulating agent comprises dialkylaminoalkyl (meth)acrylate polymers, hexosan polymers, montmorillonite-containing clay, chitosan, poly[oxyalkylene(dialkylimino)alkylene] polymers, epihalohydrin/dialkylamine polymers, polydiallydialkylammonium halide polymers, polyepiamines, dialkylamine epihalohydrin containing electrolytes, dialkylamine-epihalohydrin-alkylenediamine polymer containing halides, dimethylaminoethylmethacrylate sulfuric acid salt, dimethylaminoethylmethacrylate methyl chloride quaternary ammonium salt, dimethylaminoethylmethacrylate methyl sulfate quaternary ammonium salt, dimethylaminoethylacrylate methyl chloride quaternary ammonium salt, acrylamidopropyltrimethyl ammonium chloride, or a combination of any two or more thereof.

9. The composition of claim 1, wherein the coagulating agent comprises aluminum chlorohydrate, aluminum sulfate, zinc chloride, ferric chloride, calcium chloride, magnesium hydroxide, calcium propionate, calcium polyphosphate, potassium tripolyphosphate, zinc ammonium bicarbonate, zinc ammonium nitrate, zinc ammonium acetate, sodium chloride, potassium chloride, potassium bromide, sodium sulfate, magnesium sulfate, copper sulfate, zinc sulfate, ferric sulfate, ferrous sulfate, magnesium chloride, magnesium carbonate, alum, calcium primary phosphate, magnesium primary phosphate, zinc primary phosphate, or a combination of any two or more thereof.

10. The composition of claim 1, wherein the coagulating agent is present at about 0.01 wt % to about 20 wt %, based on a total weight of the second composition.

11. The composition of claim 1, wherein the polymeric binder comprises a hyperbranched polymer or a polymer comprising a covalently bonded surfactant.

12. The composition of claim 11, wherein the hyperbranched polymer comprises the reaction product of: an acid-functional resin and an epoxy;
wherein the hyperbranched polymer comprises a carboxyl group, a hydroxyl group, an amino group, a uredo group, an acetoacetoxy group, a diacetone group, or a combination of any two or more thereof.

13. The composition of claim 1, wherein the polymeric binder is present in an amount from about 5 wt % to about 50 wt %, based on a total weight of the composition.

14. The composition of claim 1, wherein the composition further comprises water.

15. A process for forming the coating of claim 1, the process comprising:
applying the first composition to the surface of the substrate and applying the second composition to the surface of the substrate, or co-applying the first composition and the second composition to the surface of the substrate; and
allowing the first composition and the second composition to crosslink to form the coating within 30 seconds;
wherein the coating is non-sagging, water-resistant, and dry-to-the touch.

16. The process of claim 15, wherein the first composition, the second composition, or both the first and second compositions further comprises an additive.

17. The process of claim 15, wherein the surface is a vertical surface.

18. A 2-pack coating kit comprising:
a first pack containing the first composition of claim 1;
a second pack containing the second composition of claim 1;

wherein:
 the first composition and the second composition are configured to form a coating within 30 seconds of application to a substrate, and the coating is non-sagging, water-resistant, and dry-to-the touch.

* * * * *